United States Patent [19]

Burkholder

[11] 4,129,279
[45] Dec. 12, 1978

[54] TRUSS CLIP

[75] Inventor: Harvey Z. Burkholder, Ephrata, Pa.

[73] Assignee: Favorite Manufacturing, Inc., New Holland, Pa.

[21] Appl. No.: 868,223

[22] Filed: Jan. 9, 1978

[51] Int. Cl.² .............................................. A47F 5/00
[52] U.S. Cl. .................................. 248/165; 211/182; 211/192; 403/316
[58] Field of Search ............... 211/192, 183, 182, 189, 211/190, 191; 248/165, 188, 188.1, 243; 403/408, 405, 403, 316; 108/111, 107; 52/36

[56] References Cited

U.S. PATENT DOCUMENTS

| | | | |
|---|---|---|---|
| 2,950,826 | 8/1960 | Degener | 211/191 |
| 3,465,895 | 9/1969 | Miller | 211/191 |
| 3,510,010 | 5/1970 | Gasner | 211/192 |
| 3,858,988 | 1/1975 | Cohen | 211/189 X |
| 3,862,691 | 1/1975 | Mori et al. | 108/111 X |

Primary Examiner—Roy D. Frazier
Assistant Examiner—Robert W. Gibson, Jr.
Attorney, Agent, or Firm—Stanley B. Kita

[57] ABSTRACT

A truss for supporting cages in a poultry cage system comprises a pair of inclined upstanding legs and a series of vertically-spaced horizontal cross-members connected thereto by novel clips which are specially designed to enable the cross-members to be connected to the legs with a minimum of labor. Opposite ends of each cross-member have a pair of spaced apertures which register with a pair of similarly-spaced apertures in the truss legs. The clip has a front flange with a pair of rearwardly turned lugs which are received in the leg and arm apertures and which have hooks located below the lower edges of the apertures. The legs also have holes located below their apertures and below the lower edge of the cross-member, and the clip has a deformable angulated tab depending from the lower portion of the flange and extending into the holes in the legs. To assemble the truss, the clip is engaged with the cross-member and is inserted into the leg apertures, after which the cross-member and clip are slid downwardly to cause the tab to register with the hole in the leg, whereupon the tab is struck by a hammer and engaged in the hole for locking the cross-member to the leg.

7 Claims, 6 Drawing Figures

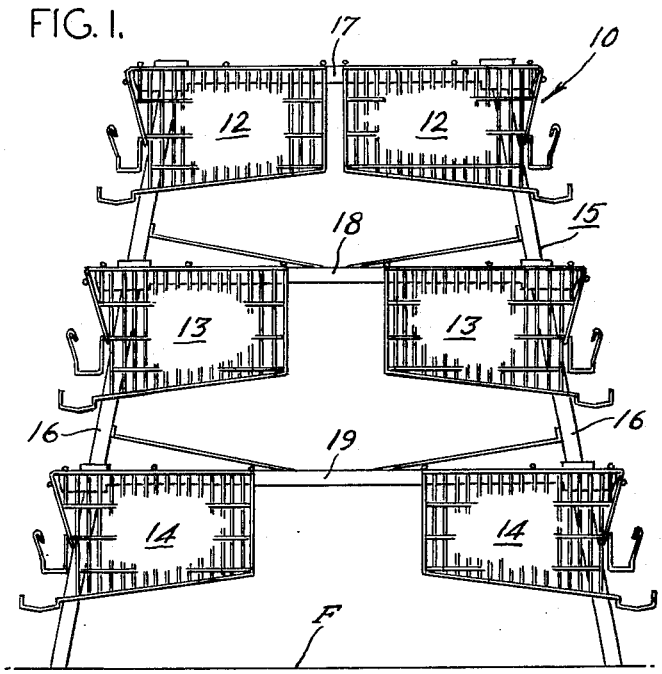
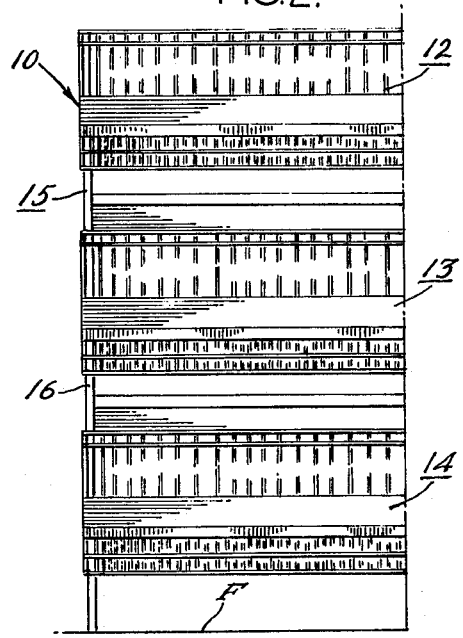
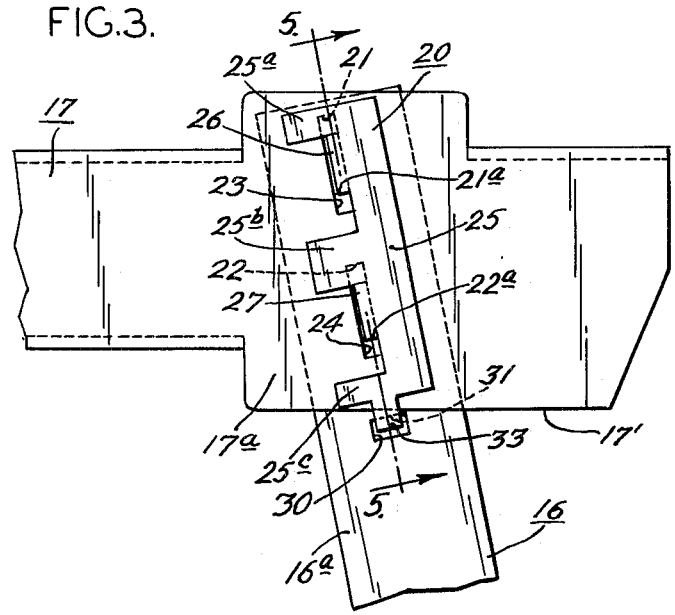
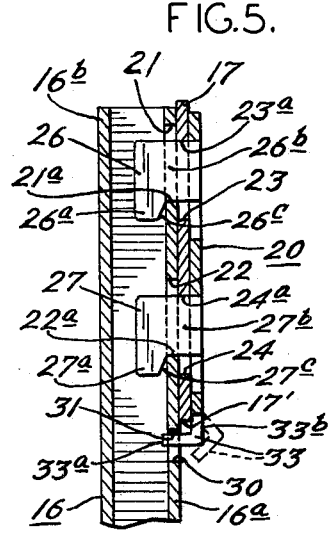
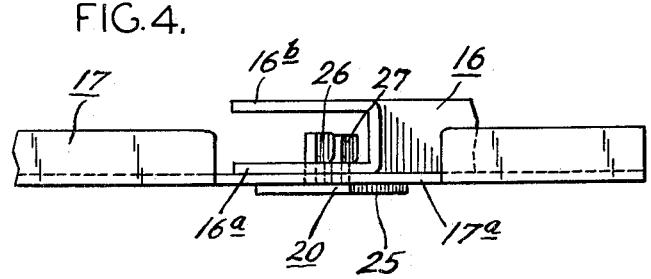

TRUSS CLIP

The present invention relates to support trusses for poultry cages, and more particularly, the present invention relates to connectors for use in assembling the trusses.

In modern egg-producing installations, laying hens are confined in elongated wire mesh cages in a hen house. In some installations, the cages are disposed in vertically-spaced and inwardly offset relation to form a steplike assembly of cage rows. The rows of cages are supported at spaced intervals along their lengths by trusses. A typical truss comprises a pair of upwardly-sloping legs and a series of vertically-spaced cross-members connected at opposite ends to the legs.

Heretofore, the cross-members have been simply bolted to the legs to provide the truss assembly. Conventional bolts, although functioning satisfactorily, are undesirable because of the time required to install and tighten them, even when automated wrenches are employed. Although a hook-like structure carried on each end of a cross-member for engaging apertures in uprights has been proposed for cage trusses, such structure is undesirable because of the absence of a suitable locking action to prevent inadvertent disassembly during handling of the trusses. Considering the number of trusses which are required in a typical cage system, it should be apparent that a connector which reduces the amount of time required to assemble a cage system is highly desirable.

With the foregoing in mind, a primary object of the present invention is to provide novel means for connecting legs and cross-arms in a cage truss assembly.

It is another object of the present invention to provide a unique connector which enables a truss to be assembled expeditiously with a minimum of labor and without requiring any special tools.

A further object of the present invention is to provide an improved truss clip which can be manufactured economically and installed readily even by relatively unskilled workmen.

A still further object of the present invention is to provide a unique clip for joining together the components of a truss to form a sturdy assembly capable of safely accepting moderate loads.

More specifically, the present invention provides a clip for use in a truss assembly comprising a pair of legs and a series of vertically-separated cross members to connect opposite ends of each cross member to the legs. The clip has a flange which engages flush against the front of the cross member, and the hooks are disposed behind the leg after the cross member and clip are assembled and slid downwardly relative to the leg. A hole is provided in the leg below the lower edge of the cross member, and the clip has a deformable tab which is hammered into the hole in the leg to prevent the cross member from moving upwardly and being disconnected from the leg after the truss has been assembled. The clip transfers loads on the cross member to the truss legs via the lugs.

These and other objects, features and advantages of the present invention should become apparent from the following description when taken in conjunction with the accompanying drawings in which:

FIG. 1 is an end elevational view of a poultry cage system having truss assemblies which embody the present invention;

FIG. 2 is a fragmentary side-elevational view of the cage system illustrated in FIG. 1;

FIG. 3 is an enlarged fragmentary view illustrating a clip connecting a cross member to one of the legs in the truss assembly of FIG. 1;

FIG. 4 is a plan view of the assembly illustrated in FIG. 3;

FIG. 5 is a sectional view taken along line 5—5 of FIG. 3; and

Figure 6:
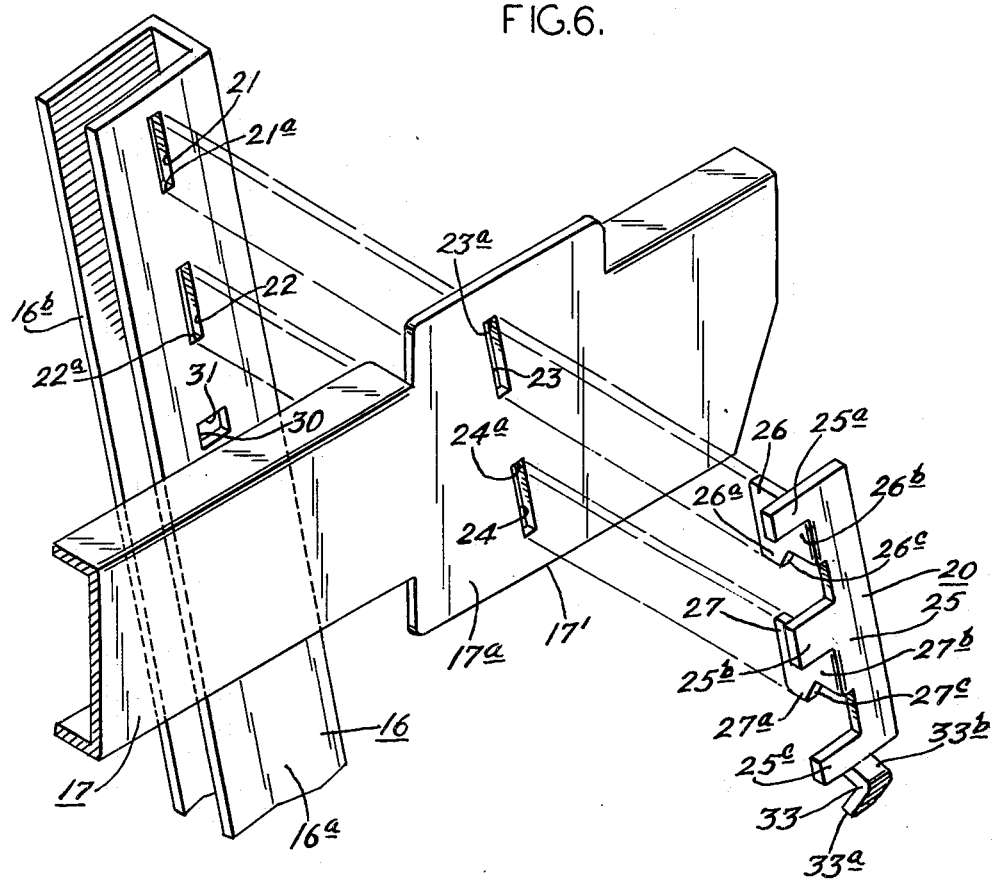
FIG. 6 is an exploded view of the leg, cross-arm and clip assembly illustrated in FIG. 3.

Referring now to the drawings, FIG. 1 illustrates one end of a poultry cage system 10 in which the present invention finds particular utility. As best seen therein, the cage system 10 comprises a series of horizontally-elongated cage rows 12, 13 and 14 disposed in pairs in vertically-spaced inwardly-offset relation in a steplike pattern. The pairs of cage rows, such as the upper pairs 12 are supported at spaced intervals on trusses, such as the truss 15 illustrated at the end of the cage rows in FIG. 2. Each truss comprises a pair of metal members or legs 16 projecting upwardly in converging relation from a floor F. The upright leg members 16 are connected together at spaced vertical locations by a series of cross-arm members 17, 18 and 19. The cross-arm members support the cages adjacent their ends.

As described thus far, the cage system 10 is of conventional construction. Heretofore, the cross-arms 17, 18 and 19 have been bolted to the uprights 16 at the intersections of the cross-arms with the legs. As noted heretofore, the use of bolts to connect the cross-arms to the legs is undesirable because of the significant amount of labor required to effect the connection even when air-powered speed wrenches, etc. are employed by skilled workmen.

In accordance with the present invention, cross-arms are connected to legs by means of a novel clip 20 to provide a strong and secure cage truss. To this end, each cross member or arm, such as the uppermost cross member 17, has a shallow, channel-shaped cross-section with enlarged flattened web portions 17a at opposite ends. Each leg or upright 16 has a deep, channel-shaped cross-section with a pair of parallel webs or flanges 16a and 16b extending in spaced parallel relation with one another. The web 17a of the cross member 17 engages flush against the front web 16a of the leg 16 in the manner illustrated in FIG. 4.

As best seen in FIG. 6, the leg 16 has a pair of elongated apertures 21 and 22 spaced apart longitudinally in its front flange or web 16a. The web 17a of the cross member 17 has a like pair of apertures 23 and 24 which are similarly spaced for registration with the leg apertures 21 and 22. Preferably, the apertures 21 and 22 are disposed at about the longitudinal median of the front flange 16a.

The clip 20 has a flat flange portion 25 and a pair of lugs 26 and 27 formed integral with the flange 25. The lugs 26 and 27 are aligned with one another in a common plane which is disposed orthogonal to the plane of the clip-flange 25 and which extends lengthwise thereof. In addition, each lug, such as the upper lug 26, has a hook-like tip 26a and a web portion 26b adjacent the flange 25 which has a shorter vertical dimension than the tip portion 26a. An inclined edge 26c connects the bottom of the tip portion 26a with the bottom of the web portion 26b, and the distance between the uppermost terminus of the edge 26c and the back of the clip flange 25 corresponds substantially to the combined thickness of the upright and cross member webs 16a and 17a. Preferably, both lugs 26 and 27 are formed in a progressive die which leaves at least one, and preferably a series of fingers or residual extensions 25a, 25b and 25c in the plane of the clip flange 25. Of course, the lower hook 27 has a similar structure with similar reference numeral subscripts.

In order to connect the cross member 17 to the leg 16 the clip lugs 26 and 27 are aligned with the apertures 23 and 24 in the cross member 17, and the clip lugs 26 and 27 are pushed rearwardly therethrough until the clip flange 25 engages flush against the front of the web 17a of the cross member 17. At this point in assembly, the elongated portion of the clip flange 25 extends along one side of the apertures 23 and 24, and the lateral extensions 25a, 25b and 25c extend across the line of the apertures to provide a means for ensuring the projection of the lugs orthogonal to the plane of the cross member. The thus engaged clip 20 and cross member 17 are then pushed rearwardly with the clip lugs 26 and 27 aligned with the apertures 21 and 22 in the leg 16 until the cross member web 17a is engaged flush against the front of the web 16a of the leg 16. Thereafter, the clip 20 and cross member 17 are forced downwardly so that the bottoms of the lug webs 26b and 27b engage the bottoms 21a and 22a of the leg apertures 21 and 22. At this point, the upper edges 23a and 24a of the cross member apertures 23 and 24 engage the tops of the lug webs 26b and 27b so that downward loads on the cross member 17 are transferred in shear to the leg 16 by way of the lug webs 26b and 27b. The hooks 26a and 27a are disposed behind the back of the front flange 16a to prevent the cross member 17 from being pulled frontward away from the leg 16. Moreover, the inclined edges 26c and 27c of the lugs 26 and 27 provide a camming action as the cross member 17 is forced downwardly during assembly to ensure tight engagement of the cross member 17 with the leg 16.

The cross member 17 is securely fastened to the legs 16 to prevent inadvertent disengagement in handling. To this end, the clip 20 is designed to cooperate with the legs 16 in such a manner as to prevent the cross member 17 from moving upwardly after it has been pushed downwardly and the clip hooks 26a and 27a engaged behind the leg flange 16a. For this purpose, the clip 20 has deformable tab means 33 which is designed to engage the upper edge 31 of a rectangular hole 30 located in the leg 16 in line with the apertures 21 and 22 therein. The hole edge 31 is located so as to be exposed below the lower edge 17' of the cross member web 17a when the cross member 17 is in its downwardmost position as illustrated in FIG. 3. As best seen in FIG. 5, the tab means 33 on the clip 20 is formed integral with the clip flange 25 and depends below the lower edge thereof. The tab 33 has a tip 33a and a web 33b disposed in angular relation with one another. The tab web 33b is bent frontward out of the plane of the clip flange 25 and is arranged so that the tip 33a of the tab 33 is clear of the front web 16a of the leg 16 when the clip 20 is engaged flush against the front web 17a of the cross member 17. The length of the tab tip 33a is greater than the combined wall thicknesses of the upright web 16a and the cross member web 17a, and the hole 30 is dimensioned so as to enable the tab tip 33a to pivot into the hole when the tab 33 is struck by a hammer. When thus engaged, the tip 33a of the tab 33 prevents the clip 20 from moving vertically relative to the leg 16 and thereby prevents the hooks 26a and 27a from being disengaged from behind the front flange 16a of the leg 16. As a result, the clip 20 cooperates with the leg 16 to secure the cross member 17 against inadvertent disengagement.

From the foregoing, it should be apparent that the interconnection can be made rapidly with only a hammer being required, and although the connection is intended to be permanent, the clip 20 could be removed and the cross member 17 disconnected from the upright 16 by prying the tab 33 out of the hole 30 and reversing the aforementioned assembly procedure.

In the illustrated embodiment, the tab 33 is located at the bottom of the clip 20. It should be apparent that the tab 33 could be located at the top of the clip or in some other location, provided that the hole 30 and its edge 31 are similarly located. For instance, the hole 30 could be located above the upper edge of the cross member 17 and the tab 33 located at the top of the clip 20. Also, if less of a load-carrying capability and less truss rigidity is satisfactory, the clip 20 need have but one lug. Needless to say, the clip 20 is fabricated of steel which allows the tab 33 to be bent without breaking.

While a preferred embodiment of the present invention has been described in detail and illustrated herein, it should be apparent that various modifications, alterations and changes may be made without departing from the spirit and scope of the present invention as defined in the appended claims.

I claim:

1. In a truss assembly adapted to be assembled with a like truss assembly to provide supports for animal cages, said truss assembly including a pair of legs and at least one cross member extending across the legs, said legs and cross member each having web portions engaging flush against one another and having aperture means in said engaging web portions, the improvement comprising clip means for connecting said cross member to each leg, said clip means having a flange engaging the web portion of said cross member, lug means extending from said flange and rearwardly through said aperture means, said lug means having hook means disposed behind said leg below its aperture means after said cross member and clip have been assembled and slid downwardly relative to said leg, means on each leg providing an edge adjacent the aperture means therein, said edge being located relative to said cross member so as to be exposed after said cross member and clip have been slid downwardly and said hook means disposed below the lower edge of the aperture means in the legs, and deformable tab means carried on said clip flange and adapted to be engaged with said edge to limit upward movement of said cross member and clip relative to the leg for preventing inadvertent disengagement of the cross member from the leg.

2. Apparatus according to claim 1 wherein said edge means on said leg is located below the aperture means therein, and said clip tab means depends below the web portion of the cross member and to engage said edge means on said leg.

3. Apparatus according to claim 2 wherein said lug means and said tab means are integral with said clip flange.

4. Apparatus according to claim 3 wherein the aperture means in said cross member has an edge engaging the top of said lug means for transferring load from the cross member and through the clip to the leg.

5. Apparatus according to claim 4 wherein said lug means includes a pair of lugs bent orthogonal to said clip flange and having webs extending through said aperture means in said cross member and leg, said cross member having a pair of edges engaging the tops of said lug webs for compressing the same against the bottoms of the aperture means in said legs thereby to transfer load on the cross member to the legs.

6. Apparatus according to claim 5 wherein said clip flange has an elongated portion extending along one side of said aperture means and at least one finger extending laterally therefrom to engage said cross member on the other side of said apertures.

7. For use in joining an arm member having at least one aperture to an upright member having a similar aperture and an anchoring hole, a one-piece clip having a flange adapted to engage flush against the outside of said arm member, a lug turned outwardly from said flange for insertion through said apertures when said members are disposed flush with their apertures in registry with one another, said lug having a hook portion adapted to engage the inside of said upright, below the aperture therein, and a tab formed from the clip flange portion and bendable into engagement with an edge of said anchoring hole.

* * * * *